United States Patent [19]
Matsushita et al.

[11] Patent Number: 5,912,287
[45] Date of Patent: Jun. 15, 1999

[54] SILICONE RUBBER COMPOSITION AND METHOD FOR THE PREPARATION THEREOF

[75] Inventors: Takao Matsushita; Osamu Takuman, both of Chiba Prefecture, Japan

[73] Assignee: Dow Corning Toray Silicone Co., Ltd., Tokyo, Japan

[21] Appl. No.: 08/896,223

[22] Filed: Jul. 17, 1997

[30] Foreign Application Priority Data

Jul. 31, 1996 [JP] Japan ..................................... 8-219441

[51] Int. Cl.⁶ ..................................................... C08K 5/34
[52] U.S. Cl. ............................. 524/91; 524/94; 524/262; 524/398; 524/493
[58] Field of Search ................................ 524/91, 94, 262, 524/398, 493

[56] References Cited

U.S. PATENT DOCUMENTS

| | | | |
|---|---|---|---|
| 3,445,420 | 5/1969 | Kookostsedes et al. | 260/37 |
| 3,514,424 | 5/1970 | Noble et al. | 260/37 |
| 3,635,874 | 1/1972 | Laur et al. | 260/37 SB |
| 3,936,476 | 2/1976 | Itoh et al. | 260/37 SB |
| 4,310,444 | 1/1982 | Hamada et al. | 260/18 |
| 4,808,634 | 2/1989 | Uriarte et al. | 528/15 |
| 5,104,919 | 4/1992 | Okami et al. | 528/15 |

FOREIGN PATENT DOCUMENTS

| | | | |
|---|---|---|---|
| 0 359 252 | 9/1989 | European Pat. Off. | C08L 83/07 |
| 51-35501 | 10/1976 | Japan . | |

*Primary Examiner*—Melvyn I. Marquis
*Attorney, Agent, or Firm*—William F. Boley; Jennifer S. Warren

[57] ABSTRACT

A silicone rubber composition comprising (A) polyorganosiloxane described by average formula $R_aSiO_{(4-a)/2}$, where R denotes substituted and unsubstituted monovalent hydrocarbon groups and a is a number from 1.95 to 2.05 and having at least 2 silicon-bonded alkenyl groups in each molecule;

(B) microparticulate silica;

(C) the reaction mixture of
(a) a platinum compound and
(b) an organosilicon compound described by general formula

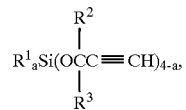

where $R^1$, $R^2$, and $R^3$ represent $C_1$ to $C_{10}$ monovalent hydrocarbon groups and a is 1, 2, or 3;

(D) curing agent, and optionally (E) triazole compound.

17 Claims, No Drawings

SILICONE RUBBER COMPOSITION AND METHOD FOR THE PREPARATION THEREOF

BACKGROUND OF INVENTION

This invention relates to silicone rubber compositions and methods for the preparation thereof. More particularly, this invention relates to a highly flame-retardant silicone rubber composition that also has good electrical insulating characteristics and to a method for the preparation thereof.

Silicone rubbers find frequent use in a variety of applications as a consequence of their excellent heat resistance, excellent resistance to aging, excellent electrical properties, and the like. However, a drawback to silicone rubbers is their flammability and in response to this numerous methods have been proposed for making silicone rubbers self-extinguishing (flame retardant). For example, Japanese Patent Publication (Kokoku) Number Sho 44-2591 (2,591/1969) teaches the composition afforded by blending a platinum compound, such as chloroplatinic acid or a platinum-olefin complex, into a silicone rubber compound. However, these platinum compounds alone do not provide an acceptable flame retardancy, and this fact has resulted in a good deal of research into the combination of these platinum compounds with inorganic filler in order to improve the flame retardancy. As examples of this, Japanese Patent Publication (Kokoku) Number Sho 47-21826 (21,826/1972) teaches a composition in which a platinum compound and fumed titanium dioxide are blended into a silicone rubber compound; Japanese Patent Publication (Kokoku) Number Sho 51-23979 (23,979/1976) teaches a composition in which a platinum compound and manganese carbonate micropowder are blended into a silicone rubber compound; and Japanese Patent Publication (Kokoku) Number Sho 51-35501 (35,501/1976) discloses a composition in which a platinum compound and iron oxide are blended into a silicone rubber compound.

Nevertheless, even these silicone rubber compositions do not exhibit a fully satisfactory flame retardancy. Moreover, they each suffer from other, specific problems. The composition containing a platinum compound and fumed titanium dioxide yields a silicone rubber whose electrical properties deteriorate in a humid atmosphere. The composition containing a platinum compound and manganese carbonate suffers from an inhibited vulcanization, and hence a failure to vulcanize thoroughly, when an acyl-type organoperoxide is used as its vulcanizing agent. Finally, the composition containing a platinum compound and iron oxide does not exhibit an improved flame retardancy in the absence of large additions of iron oxide, but at the same time these large additions cause a diminished mechanical strength of the resulting silicone rubber.

Other tactics known for achieving improvements in the flame retardancy of silicone rubber compositions consist of increasing the addition of the nonflammable inorganic filler and reducing the addition of the flammable polyorganosiloxane. Unfortunately, the silicone rubber compositions afforded by these tactics have a poor molding processability, and their thermal cure affords silicone rubber moldings with reduced mechanical strength. These drawbacks place limitations on the applications of these compositions.

As a result of extensive investigations directed to solving the problems described above, the inventors discovered that the blending of special additive components into a specific silicone rubber composition affords a cured silicone rubber with a vastly improved flame retardancy and also improved electrical insulation characteristics as typified by tracking resistance. The present invention was achieved based on this discovery.

In specific terms, an object of the present invention is to provide a silicone rubber composition that cures into a highly flame-retardant silicone rubber with excellent electrical insulation characteristics and that does so without sacrificing mechanical strength. An additional object of the present invention is to provide a method for the preparation of said silicone rubber composition.

SUMMARY OF INVENTION

A silicone rubber composition comprising
(A) polyorganosiloxane described by average formula $R_a SiO_{(4-a)/2}$, where R denotes substituted and unsubstituted monovalent hydrocarbon groups and a is a number from 1.95 to 2.05 and having at least 2 silicon-bonded alkenyl groups in each molecule;
(B) microparticulate silica;
(C) the reaction mixture of
  (a) a platinum compound and
  (b) an organosilicon compound described by general formula

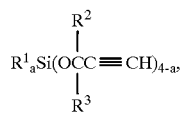

where $R^1$, $R^2$, and $R^3$ represent $C_1$ to $C_{10}$ monovalent hydrocarbon groups and a is 1, 2, or 3;
(D) curing agent, and optionally
(E) 0.01 to 10 weight parts triazole compound.

DESCRIPTION OF INVENTION

The present invention is a silicone rubber composition comprising
(A) 100 weight parts polyorganosiloxane described by average formula $R_a SiO_{(4-a)/2}$, where R denotes substituted and unsubstituted monovalent hydrocarbon groups and a is a number from 1.95 to 2.05 and having at least 2 silicon-bonded alkenyl groups in each molecule;
(B) 10 to 100 weight parts microparticulate silica;
(C) the reaction mixture of
  (a) a platinum compound and
  (b) an organosilicon compound described by general formula

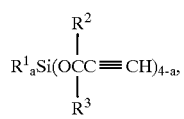

where $R^1$, $R^2$, and $R^3$ represent $C_1$ to $C_{10}$ monovalent hydrocarbon groups and a is 1, 2, or 3, in a quantity that provides 1 to 1,000 weight parts as platinum metal for each 1,000,000 weight parts component (A); and
(D) curing agent in a quantity sufficient to cure the present composition.

The invention also relates to a silicone rubber composition comprising
(A) 100 weight parts polyorganosiloxane described by average formula $R_a SiO_{(4-a)/2}$, where R denotes substituted and unsubstituted monovalent hydrocarbon groups and a is a number from 1.95 to 2.05 and having at least 2 silicon-bonded alkenyl groups in each molecule;

(B) 10 to 100 weight parts microparticulate silica;

(C) the reaction mixture of
   (a) a platinum compound and
   (b) an organosilicon compound described by general formula

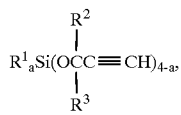

where $R^1$, $R^2$, and $R^3$ represent $C_1$ to $C_{10}$ monovalent hydrocarbon groups and a is 1, 2, or 3 in a quantity that provides 1 to 1,000 weight parts as platinum metal for each 1,000,000 weight parts component (A);

(E) 0.01 to 10 weight parts triazole compound; and (D) curing agent in a quantity sufficient to cure the present composition.

The invention additionally relates to methods for the preparation of these silicone rubber compositions.

To explain the preceding in greater detail, the polyorganosiloxane (A) used in the present composition is the base component of this composition. Polyorganosiloxane (A) is described by average formula $R_a SiO_{(4-a)/2}$ in which R denotes substituted and unsubstituted monovalent hydrocarbon groups. R is exemplified by alkyl groups such as methyl, ethyl, and propyl; alkenyl groups such as vinyl, allyl, butenyl, and hexenyl; aryl groups such as phenyl; 3,3,3-trifluoropropyl; 2-phenylethyl; and 2-cyanoethyl. The subscript a is a number from 1.95 to 2.05. Component (A) contains at least 2 silicon-bonded alkenyl groups in each molecule. The alkenyls may be bonded in terminal or nonterminal position or at both positions. The molecular structure of component (A) can be linear chain or partially branched linear chain. The viscosity of component (A) is not critical and it can generally have a viscosity of 100 to 20,000,000 mPa.s at 25° C. Component (A) may be a homopolymer or copolymer or a mixture of these polymers. The units making up component (A) are specifically exemplified by the dimethylsiloxy unit, the vinylmethylsiloxy unit, the methylphenylsiloxy unit, and the (3,3,3-trifluoropropyl)methylsiloxy unit. The molecular terminal groups of component (A) are exemplified by trimethylsiloxy, silanol, vinyldimethylsiloxy, and vinylmethylhydroxysiloxy. Polyorganosiloxane (A) is exemplified by vinyldimethylsiloxy-endblocked dimethylsiloxane-vinylmethylsiloxane copolymers, vinyldimethylsiloxy-endblocked polydimethylsiloxanes, silanol-endblocked dimethylsiloxane-vinylmethylsiloxane copolymers, vinylmethylhydroxysiloxy-endblocked dimethylsiloxane-vinylmethylsiloxane copolymers, and vinyldimethylsiloxy-endblocked dimethylsiloxane-methylphenylsiloxane-vinylmethylsiloxane copolymers.

The microparticulate silica (B) used in the present composition is a reinforcing filler. Component (B) is an essential component that imparts mechanical strength to the cured silicone rubber made from the present composition. The microparticulate silica is exemplified by dry-process silicas such as fumed silica and by wet-process silicas such as precipitated silica. Also useable is microparticulate silica whose surface has been hydrophobicized by treatment with an organosilicon compound such as an organosilane, organosilazane, polyorganosiloxane, or polyorganocyclosiloxane. Component (B) preferably has a specific surface area of at least 50 m²/g and more preferably of at least 100 m²/g. Component (B) is added at from 10 to 100 weight parts per 100 weight parts component (A). The use of less than 10 weight parts of component (B) leads to reduced post-cure mechanical strength for the present composition, while blending of component (B) into component (A) becomes highly problematic at more than 100 weight parts.

The platinum compound (C) used in the present composition is the component that characterizes the present composition. The post-cure flame retardancy of the silicone rubber is very substantially improved by the admixture of this component. The admixture of this component also provides a substantial improvement in the electrical insulating properties, such as the tracking resistance and so forth. For the present purposes, the reaction mixture of (a) a platinum compound and (b) organosilicon compound with the preceding general formula denotes the reaction product afforded by the reaction of components (a) and (b) and also mixtures of this reaction product with its component (b) precursor. Component (C) does not exhibit the catalytic activity, for example, as a hydrosilylation catalyst, that is exhibited by the component (a) platinum compound that is a precursor to component (C). The component (a) platinum compound used for component (C) is exemplified by chloroplatinic acid, chloroplatinic acid-olefin complexes, and chloroplatinic acid-alkenylsiloxane complexes. Among these, chloroplatinic acid and the platinum-alkenylsiloxane complexes disclosed in Japanese Patent Publication (Kokoku) Number Sho 42-22924 (22,924/1967) are particularly preferred. The component (b) in component (C) is an organosilicon compound described by general formula

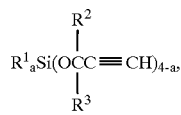

where $R^1$, $R^2$, and $R^3$ represent $C_1$ to $C_{10}$ monovalent hydrocarbon groups and a is 1, 2, or 3. The $R^1$, $R^2$, and $R^3$ in this formula are exemplified by alkyl such as methyl, ethyl, and propyl and by aryls such as phenyl. The following compounds are typical examples of this organosilicon compound.

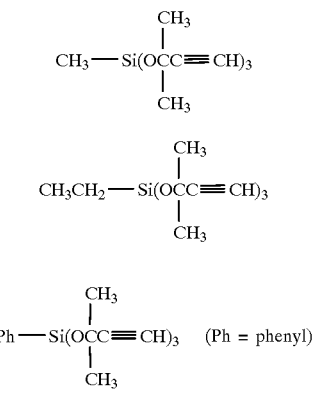

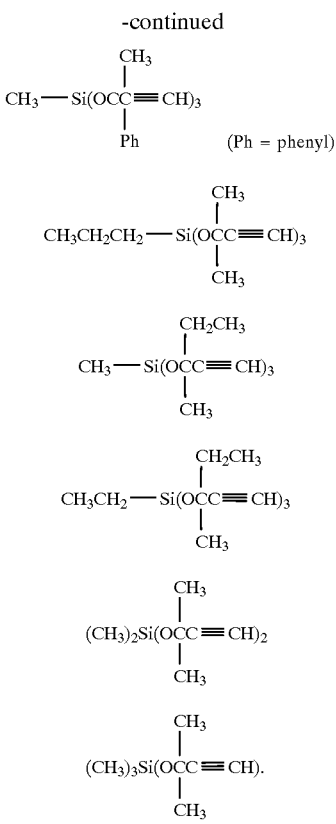

The component (a) to component (b) weight ratio is preferably in the range of from 1:1 to 1:100 and more preferably 1:1 to 1:50. Also preferred are quantities that provide more moles component (b) than moles component (a). The subject reaction mixture can be prepared, for example, simply by mixing components (a) and (b) and shaking or stirring the mixture at ambient or elevated temperature followed by standing at quiescence.

Component (C) is added to the present composition in a quantity that provides 1 to 1,000 weight parts and preferably 10 to 200 weight parts, in each case as platinum metal per 1,000,000 weight parts component (A). The use of less than 1 weight part of platinum provided by component (C) will fail to provide an acceptable flame retardancy and acceptable electrical insulating properties (e.g., tracking resistance). No effect is demonstrated by additions in excess of the upper limit of 1,000 weight parts platinum to the present composition as component (C).

The curing agent (D) used in the present composition is a vulcanizing agent for cure of the present composition. A typical example of component (D) is an organoperoxide, for example, benzoyl peroxide, tert-butyl perbenzoate, 2,4-dichlorobenzoyl peroxide, dicumyl peroxide, and 2,5-dimethyl-2,5-di(tert-butylperoxy)hexane.

The curing agent (D) can also take the form of the combination of a hydrosilylation catalyst and a polyorganohydrogensiloxane having at least 3 silicon-bonded hydrogen atoms in each molecule. In this case the polyorganohydrogensiloxane functions as a crosslinker: the silicon-bonded hydrogen in the polyorganohydrogensiloxane addition-reacts with the silicon-bonded alkenyl in component (A) in the presence of the hydrosilylation catalyst to crosslink and thereby cure the present composition. The polyorganohydrogensiloxane must contain at least 3 silicon-bonded hydrogen atoms in each molecule. In addition to the silicon-bonded hydrogen, the organic groups present in this polyorganohydrogensiloxane are exemplified by alkyls such as methyl, ethyl, and propyl; aryls such as phenyl and tolyl; and substituted alkyls such as 3,3,3-trifluoropropyl and 3-chloropropyl.

The molecular structure of the polyorganohydrogensiloxane used as a crosslinker can be linear chain, branch-containing linear chain, cyclic, or network. While the polyorganohydrogensiloxane's viscosity is not critical, viscosities of 3 to 10,000 mPa.s at 25° C. are preferred. This component should be added in a quantity that affords values of 0.5:1 to 20:1 and preferably 1:1 to 1:3 for the ratio in the composition of the number of moles of SiH per number of moles of silicon-bonded alkenyl. A satisfactory cure will not be obtained for the present composition when this molar ratio is below 0.5. Hydrogen gas evolution and foaming can occur when this ratio exceeds 20.

The hydrosilylation catalyst used in combination with the polyorganohydrogensiloxane is a cure-accelerating catalyst. This hydrosilylation catalyst is exemplified by elemental platinum metal, platinum compounds, and compositions whose main component is a platinum compound, in each case insofar as the particular species exhibits a hydrosilylation-accelerating catalytic activity. Such platinum-based hydrosilylation catalysts are exemplified by microfinely divided platinum, chloroplatinic acid, alcohol-modified chloroplatinic acid, platinum-diketone complexes, platinum-olefin complexes, chloroplatinic acid-alkenylsiloxane complexes, and these catalysts supported on a carrier such as alumina, silica, and carbon black. The amount of addition of this component cannot be rigorously specified because it will vary with the nature of the hydrosilylation catalyst. In general, however, this component can be added at from 1 to 500 weight parts and preferably at from 5 to 100 weight parts, in each case as platinum metal per 1,000,000 weight parts component (A).

The triazole compound (E) optionally used in the present invention is employed when additional improvements are required in the flame retardancy of the composition of components (A) to (D). This triazole compound includes benzotriazole, 1,2,3-triazole, 1,2,4-triazole, and their derivatives. Specific examples are benzotriazole, 1-methylbenzotriazole, 5,6-3 dimethylbenzotriazole, 2-phenylbenzotriazole, 1-methyl-1,2,3-triazole, 1-phenyl-1,2,3-triazole, 4-methyl-2-phenyl-1,2,3-triazole, 1-methyl-1,2,4-triazole, and 1,3-diphenyl-1,2,4-triazole. The triazole compound can be added to the present composition at from 0.01 to 10 weight parts per 100 weight parts component (A).

The present composition comprises components (A) to (D) or (A) to (E) as described above, but in addition to these components the composition can contain, insofar as the objects of the present invention are not impaired, the various additives known for use in silicone rubber compositions. These additives are exemplified by non-reinforcing fillers, pigments, heat stabilizers, flame retardants, internal release agents, plasticizers, and so forth. The non-reinforcing fillers are exemplified by calcium carbonate, mica, magnesium oxide, aluminum oxide, and magnesium hydroxide. The pigments are exemplified by carbon black, iron oxide red, and titanium dioxide. The heat stabilizers are exemplified by rare earth oxides, rare earth hydroxides, cerium silanolate, and the cerium salts of fatty acids. The flame retardants are exemplified by fumed titanium dioxide, carbon black in small amounts, and manganese carbonate.

The present composition can be prepared simply by mixing components (A) to (D) and optionally (E) to homogeneity in their prescribed quantities. In a preferred preparative method, however, components (A) and (B) are first mixed, preferably with heating, to prepare a silicone rubber base compound, into which components (C) and (D) or (C), (E), and (D) are thereafter mixed. When component (B) takes the form of a non-hydrophobicized reinforcing silica micropowder with a specific surface of at least 50 m$^2$/g, a plasticizer, such as a silanol-endblocked diorganosiloxane oligomer or hexaorganodisilazane plus water, is preferably also used at 1 to 30 weight parts per 100 weight parts component (A). The heretofore known mixers, e.g., a kneader mixer, twin-screw continuous compounding extruder, etc., can be used to mix components (A) and (B) to give the silicone rubber base compound. A mixer such as a two-roll mill, kneader mixer, etc., can be used as the means for mixing components (C), (E), and (D).

When an organoperoxide is used as the curing agent, the present composition can be cured by heating to at least the decomposition temperature of the particular organoperoxide, for example, to 130° C. to 200° C. When, on the other hand, a combination of polyorganohydrogensiloxane and hydrosilylation catalyst is used, the composition can be cured by heating to 70° C. to 200° C. The method for molding the silicone rubber composition can be selected as appropriate for the particular application from the known molding methods, such as compression molding, extrusion molding, and the like.

The present composition cures to give a highly flame-retardant silicone rubber with excellent electrical insulating properties and does so without sacrificing mechanical strength. As a consequence, this composition can be used in applications that require such properties, for example, as electrical insulation in automobile parts and electrical appliances, devices, and instruments.

The invention is further explained below using working examples in which "parts" denotes "weight parts" and the values reported for the viscosity were measured at 25° C. The following methods were used in the examples to measure the physical properties, flame retardancy, and electrical insulating properties of the silicone rubbers.

The physical properties of the cured compositions were measured according to the methods given in JIS K 6301, "Physical Testing Methods for Vulcanized Rubber". Here, the silicone rubber composition was compression molded at 170° C./10 minutes (however, liquid silicone rubber compositions as designated in the examples were compression molded at 200° C. for 10 minutes) to give a 2 mm-thick silicone rubber sheet. Mechanical strength values were measured on the resulting silicone rubber sheet by the methods described in JIS K 6301.

Measurement of the flame retardancy of the cured silicone rubber composition was conducted as follows. The silicone rubber composition was filled into a sheet-forming mold and compression molded at 170° C./10 minutes (however, liquid silicone rubber compositions as designated in the examples were compression molded at 200° C. for 10 minutes) to give a 1 mm-thick silicone rubber sheet. This silicone rubber sheet was cut to give a test specimen with a length of 130 mm, width of 13 mm, and thickness of 1 mm. The test specimen was suspended vertically in still air and was ignited by exposure for 10 seconds to a Bunsen burner flame (11-mm flame diameter, 20-mm inner flame height, 40-mm outer flame height) by just contacting the bottom edge of the test specimen with the top of the inner flame. The Bunsen burner was then withdrawn from the test specimen and the time in seconds was measured until extinction of the flame ignited on the test specimen. This flame contact test was run twice on each of 5 test specimens, and the average (in seconds) of the 10 measurements is reported as the flame retardancy data.

Measurement of the electrical insulating properties of the cured silicone rubber compositions were conducted as follows. An inclined plane anti-tracking test was run according to International Electrotechnical Commission (IEC) Publication 587. The test instrument was a model HAT-520 from Hitachi Kasei Kogyo Kabushiki Kaisha. The test voltage was 3.5 kV. The criterion A in the tables reporting the measurement results refers to the time in minutes required until the current flowing in a high-voltage circuit passing through the test specimen exceeded 60 mA. The criterion B referenced in the tables reporting the measurement results refers to the time in minutes for the track to reach a mark on the surface of the test specimen 25 mm from the lower electrode.

Example 1. 100 Parts vinyldimethylsiloxy-endblocked dimethylsiloxane-vinylmethylsiloxane copolymer gum (degree of polymerization=3,000, 99.87 mole% dimethylsiloxy units, 0.13 mole% vinylmethylsiloxy units), 30 parts fumed silica with a specific surface of 200 m$^2$/g, and 10 parts silanol-endblocked dimethylsiloxane oligomer (viscosity= 30 mpa.s) as plasticizer were introduced into a kneader mixer and mixed to homogeneity. This mixture was mixed for an additional 60 minutes at 175° C. to form a silicone rubber base compound. The following was mixed to homogeneity into 100 parts of this base compound using a two-roll mill: the reaction mixture of methyltris (3-methyl-1-butyn-3-oxy)silane and a complex of chloroplatinic acid and divinyltetramethyldisiloxane (reaction mixture 1, platinum metal content=5,000 ppm) so as to provide 30 ppm platinum metal. Reaction mixture 1 was prepared by adding 100 parts methyltris (3-methyl-1-butyn-3-oxy) silane to 100 parts of a chloroplatinic acid/divinyltetramethyldisiloxane complex, shaking at ambient temperature, and then letting stand overnight. Finally, a curable silicone rubber composition was prepared by mixing 0.8 part of a paste of 2,5-dimethyl-2,5-di(tert-butylperoxy)hexane in 50 weight% silicone oil to homogeneity into the mixture of reaction mixture 1 and base compound prepared as described above. The physical properties, flame retardancy, and electrical insulating properties of this silicone rubber composition were measured, and the measurement results are reported in Table 1.

For purposes of comparison, a silicone rubber composition was prepared as in Example 1, but replacing reaction mixture 1 with the chloroplatinic acid/ divinyltetramethyldisiloxane complex so as to provide 30 ppm platinum metal. The properties of the cured composition were measured as in Example 1, and these results are reported as Comparative Example 1 in Table 1.

TABLE 1

Measurement Results for the Physical Properties and Flame Retardancy of the Silicone Rubbers

|  | Example 1 | Comp. Example 1 |
|---|---|---|
| composition |  |  |
| base compound (parts) | 100 | 100 |
| reaction mixture (ppm Pt) | 30 | 0 |
| physical properties |  |  |
| tensile strength (kgf/cm$^2$) | 102 | 110 |
| elongation (%) | 900 | 950 |
| tear strength A (kgf/cm) | 22 | 22 |
| flame retardancy (s) | 91 | completely burned |

TABLE 1-continued

Measurement Results for the Physical Properties
and Flame Retardancy of the Silicone Rubbers

|  | Example 1 | Comp. Example 1 |
|---|---|---|
| electrical insulating properties | | |
| criterion (A) (failure time in minutes) | 189 | 46 |
| criterion (B) (time in minutes to 25 mm) | 125 | 30 |

Example 2. 100 Parts vinyldimethylsiloxy-endblocked dimethylsiloxane-vinylmethylsiloxane copolymer gum (99.87 mole% dimethylsiloxy units, 0.13 mole vinylmethylsiloxy units), 30 parts fumed silica with a specific surface of 200 m²/g, and 10 parts silanol-endblocked polydimethylsiloxane (viscosity =30 mPa.s) as plasticizer were mixed to homogeneity with a kneader mixer. The mixture was mixed for an additional 60 minutes at 175° C. to make a silicone rubber base compound. The following were mixed to homogeneity into 100 parts of this base compound using a two-roll mill: 0.1 part benzotriazole and a reaction mixture of chloroplatinic acid and methyltris (3-methyl-l-butyn-3-oxy)silane so as to provide 30 ppm (weight) platinum metal. The subject reaction mixture was prepared by adding 100 parts methyltris(3-methyl-1-butyn-3-oxy)silane to 100 parts of an isopropyl alcohol solution of chloroplatinic acid, shaking, and then letting stand overnight. Finally, a silicone rubber composition was prepared by mixing 0.8 part of a paste of 2,5-dimethyl-2,5-di(tert-butylperoxy)hexane in 50 weight % silicone oil to homogeneity into the mixture prepared as described above. The physical properties, flame retardancy, and electrical insulating properties of this silicone rubber composition when cured were measured, and the measurement results are reported in Table 2.

For purposes of comparison, a silicone rubber composition was prepared as in Example 2, but replacing the reaction mixture of methyltris(3-methyl-1-butyn-3-oxy)silane plus chloroplatinic acid with chloroplatinic acid alone. The properties of this composition were measured as in Example 2, and these results are reported as Comparative Example 2 in Table 2.

TABLE 2

|  | Example 2 | Comp. Example 2 |
|---|---|---|
| physical properties | | |
| tensile strength (kgf/cm²) | 98 | 96 |
| elongation (%) | 910 | 900 |
| tear strength A (kgf/cm) | 27 | 28 |
| flame retardancy (s) | 58 | 211 |
| electrical insulating properties | | |
| criterion (A) (failure time in minutes) | 309 | 144 |
| criterion (B) (time in minutes to 25 mm) | 230 | 100 |

Example 3. The following were mixed to homogeneity into 100 parts vinyldimethylsiloxy-endblocked polydimethylsiloxane with a viscosity of 10,000 mPa.s: 25 parts fumed silica with a specific surface of 200 m²/g and, as surface-treatment agent for the fumed silica, 5 parts hexamethyldisilazane and 1.5 parts water. This mixture was heated for an additional 2 hours at 170° C. under a vacuum make a silicone rubber base compound. The following were then mixed to homogeneity into this base compound to give a liquid silicone rubber composition: 1.4 parts trimethylsiloxy-endblocked dimethylsiloxane-methylhydrogensiloxane copolymer with a silicon-bonded hydrogen content of 0.7 weight %, 0.8 part (30 ppm platinum metal) of the reaction mixture used in Example 1 of methyltris(3-methyl-1-butyn-3-oxy)silane with chloroplatinic acid plus divinyltetramethyldisiloxane complex, and chloroplatinic acid at 10 ppm (weight) as platinum metal as hydrosilylation catalyst. The physical properties, flame retardancy, and electrical insulating properties of this liquid silicone rubber composition were measured, and these measurement results are reported in Table 3.

TABLE 3

| physical properties | |
|---|---|
| durometer (JIS-A) | 30 |
| tensile strength (kgf/cm²) | 85 |
| elongation (%) | 740 |
| tear strength A (kgf/cm) | 9 |
| flame retardancy | 142 |
| electrical insulating properties | |
| criterion A (failure time in minutes) | 201 |
| criterion B (time in minutes to 25 mm) | 145 |

We claim:
1. A silicone rubber composition comprising
   (A) 100 weight parts polyorganosiloxane described by average formula $R_aSiO_{(4-a)}/2$, where R denotes substituted and unsubstituted monovalent hydrocarbon groups and a is a number from 1.95 to 2.05 and having at least 2 silicon-bonded alkenyl groups in each molecule;
   (B) 10 to 100 weight parts microparticulate silica;
   (C) the reaction mixture of;
      (a) a platinum compound; and
      (b) an organosilicon compound described by general formula

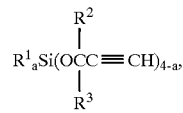

$$R^1_a Si(OCC \equiv CH)_{4-a},$$
with $R^2$ above and $R^3$ below the Si substituent.

where $R^1$, $R^2$, and $R^3$ represent $C_1$ to $C_{10}$ monovalent hydrocarbon groups and a is 1, 2, or 3 in a quantity that provides 1 to 1,000 weight parts as platinum metal for each 1,000,000 weight parts component (A); and
   (D) curing agent in a quantity sufficient to cure the composition.

2. A Silicone rubber composition comprising
   (A) 100 weight parts polyorganosiloxane described by average formula $R_aSiO_{(4-a)}/2$, where R denotes substituted and unsubstituted monovalent hydrocarbon groups and a is a number from 1.95 to 2.05 and having at least 2 silicon-bonded alkenyl groups in each molecule;
   (B) 10 to 100 weight parts microparticulate silica;
   (C) the reaction mixture of;

(a) a platinum compound; and
(b) an organosilicon compound described by general formula

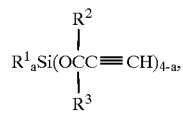

$$R^1{}_a Si(OCC\equiv CH)_{4-a},$$

where $R^1$, $R^2$, and $R^3$ represent $C_1$ to $C_{10}$ monovalent hydrocarbon groups and a is 1, 2, or 3 in a quantity that provides 1 to 1,000 weight parts as platinum metal for each 1,000,000 weight parts component (A);

(D) curing agent in a quantity sufficient to cure the composition; and (E) 0.01 to 100 weight parts triazole compound.

3. The silicone rubber composition according to claim 1, where component (b) is methyltris(3-methyl-1-butyn-3-oxy)silane.

4. The silicone rubber composition according to claim 1, where component (a) is a complex of chloroplatinic acid and divinyltetramethyldisiloxane.

5. A silicone rubber composition according to claim 1, where component (a) is chloroplatinic acid.

6. A silicone rubber composition according to claim 1, where component (D) is an organoperoxide.

7. A silicone rubber composition according to claim 1, where component (D) comprises a hydrosilylation catalyst.

8. A silicone rubber composition according to claim 1, where component (a) is chloroplatinic acid and component (b) is methyltris(3-methyl-1-butyn-3-oxy)silane.

9. A silicone rubber composition according to claim 1, where component (a) is a complex of chloroplatinic acid and divinyltetramethyldisiloxane and component (b) is methyltris (3-methyl-1-butyn-3-oxy)silane.

10. The silicone rubber composition according to claim 2, where component (b) is methyltris(3-methyl-1-butyn-3-oxy)silane.

11. The silicone rubber composition according to claim 2, where component (a) is a complex of chloroplatinic acid and divinyltetramethyldisiloxane.

12. A silicone rubber composition according to claim 2, where component (a) is chloroplatinic acid.

13. A silicone rubber composition according to claim 2, where component (D) is an organoperoxide.

14. A silicone rubber composition according to claim 2, where component (D) comprises a hydrosilylation catalyst.

15. A silicone rubber composition according to claim 2, where component (a) is chloroplatinic acid and component (b) is methyltris(3-methyl-1-butyn-3-oxy)silane.

16. A silicone rubber composition according to claim 2, where component (a) is a complex of chloroplatinic acid and divinyltetramethyldisiloxane and component (b) is methyltris (3-methyl-l-butyn-3-oxy)silane.

17. A silicone rubber composition according to claim 2, where component (E) is benzotriazole.

* * * * *